United States Patent Office 3,081,975
Patented Mar. 19, 1963

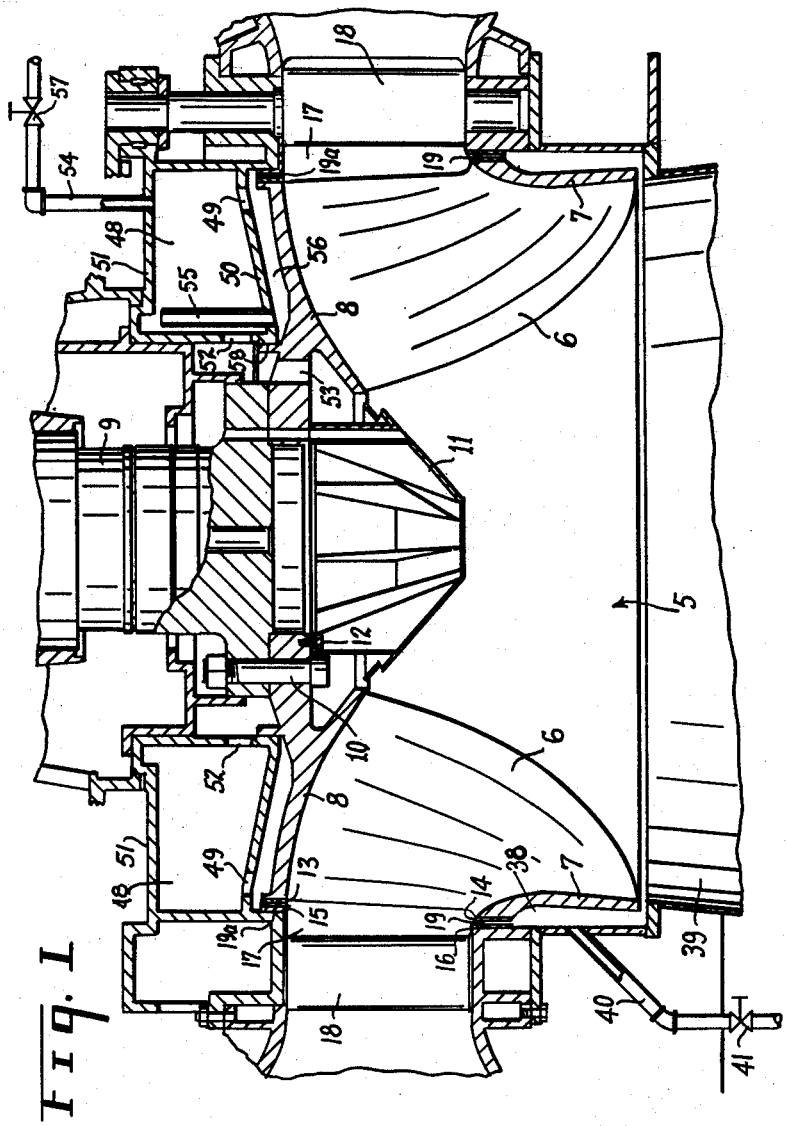

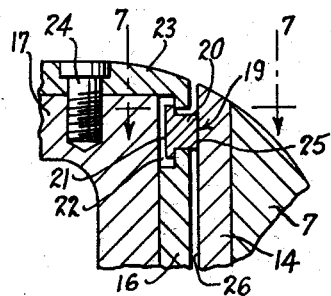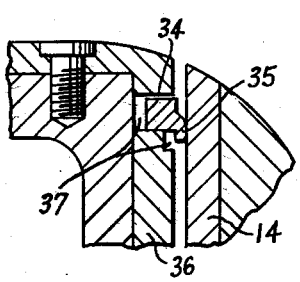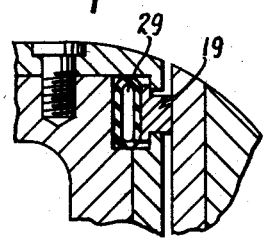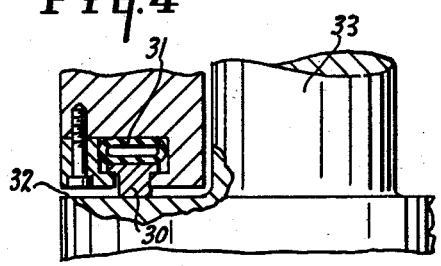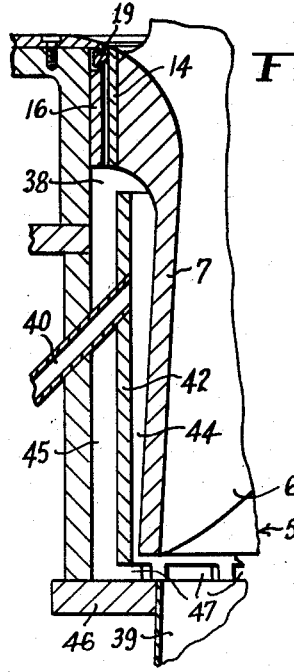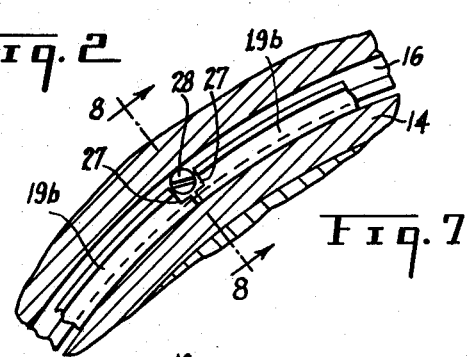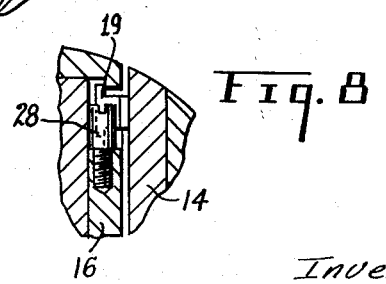

3,081,975
SEALS FOR TURBINES AND PUMPS
Robert Stanley Sproule, Montreal, Quebec, and Jacques A. Desbaillets, Westmount, Quebec, Canada, assignors to Dominion Engineering Works Limited, Montreal, Quebec, Canada
Filed Mar. 26, 1959, Ser. No. 808,546
2 Claims. (Cl. 253—26)

This invention relates to improvements in seals for turbines and pumps and particularly to runner or impeller seals whereby the leakage of water past the runner and the friction of the runner rotating in water is greatly reduced.

The invention consists essentially in the provision of a new type of runner seal located between the runner and the bottom ring and between the runner and the fixed head cover which will provide a minimum running fit clearance, between the runner and the stationary parts of the turbine or pump with the runner seal making sealing contact with both runner and stationary members, and the provision of means whereby the space between the runner crown and the fixed head cover and the space between the runner band and the stationary parts are filled with air, whereby any water passing the seal is expelled from these areas and friction and turbulence is reduced.

Air admission to the spaces between the runner and stationary parts can be controlled so as to maintain the water levels in these spaces almost clear of the runner. Such control may be by means of water-level detectors actuating air valves so that wherever the water rises above a certain level air is admitted to depress the water.

In the operation of rotating machinery such as turbines and pumps, the leakage of water between the runner and the stationary parts of the machine is considerable and has led to excess friction and turbulence at the locations where the water leaks into the enclosed spaces and also where the leakage water is drained off back into the main water flow.

It is a primary object of the present invention to reduce the volume of water allowed to leak between the running and stationary members of turbines and pumps.

A further primary object of the invention is to replace with air the water which normally fills the spaces between a turbine runner or pump impeller and the fixed parts.

A further object of the invention is to provide sealing means between the running and stationary members of turbines and pumps which will provide little or no clearance between these members without adding to the friction between them.

A further object of the invention is to provide sealing means between the running and stationary members of turbines and pumps which will, after a short running in time, provide an efficient seal against water leakage without further wear on the seal.

A further object of the invention is to provide for the introduction of air with the minimum water leakage and when desirable to pass the air into the normal water flow through the turbine or pump for the purpose of reducing the effects of turbulence in the area of the rotating mechanism.

A further object of the invention is to provide means for supplying a large amount of air for a short time to evacuate the turbulent water from the air spaces between the running and stationary elements of turbines or pumps.

These and other objects of the invention will be apparent from the following detailed description and the accompanying drawings, in which:

FIGURE 1 is a partial vertical section of a Francis-type turbine in the area of the runner and showing the upper and lower runner seals and air supply conduits.

FIGURE 2 is an enlarged vertical section of the lower portion of the runner and the stationary bottom ring and showing the seal mounted on the bottom ring but showing in addition a baffle in the space below the seal and the air supply being fed to the inner compartment formed by the baffle.

FIGURE 3 is a still further enlarged vertical section of the seal assembly shown in FIGURE 2.

FIGURE 4 is a view similar to FIGURE 3 but showing an alternative form of seal.

FIGURE 5 is a view similar to FIGURE 3 but incorporating an expansible member backing the seal member for the purpose of excluding dirt and silt from the area of the seal.

FIGURE 6 is a view of a seal assembly similar to that shown in FIGURE 5 but applied as an axial seal to the shoulder of a vertical shaft.

FIGURE 7 is a partial horizontal section on the line 7—7 of FIGURE 3 showing the abutting ends of the seal member sections and the means preventing the rotary displacement of the seal members with respect to the member on which the are mounted.

FIGURE 8 is a vertical section on the line 8—8 of FIGURE 7.

Referring to the drawings, the turbine illustrated in FIGURE 1 is of the well known Francis type in which a considerable number of features not pertinent to the present invention have been eliminated. The turbine illustrated has the runner 5 complete with runner blades 6 supported by the runner band 7 and the runner crown 8. The runner 5 is secured to the lower end of the main shaft 9 by the bolts 10. A concentric runner cone 11 is secured to the under side of the runner crown 8 by the screws 12.

The runner 5 is provided with an upper seal ring 13 and a lower seal ring 14 facing against an upper seal ring 15 and a lower seal ring 16 defining the outlet edges of the distributor ring 17 supporting the gates 18.

In order to provide a very small clearance, or no clearance, for the leakage of water between the runner seal rings 13 and 14 and the distributor ring seal rings 15 and 16, a seal ring member 19 is fitted into one or other of the facing seal rings. In the drawings the lower seal ring member 19 is shown as being carried in the stationary seal ring 16 and bearing against the rotating seal ring 14. It is to be understood that the seal member 19 could equally well be mounted on the rotating seal ring 14 and bear against the stationary seal ring 16. It is also understood that the seal member 19, illustrated in detail as applied at the runner band 7, is a duplicate of the upper seal member 19a sealing between the runner crown 8, seal ring 13 and the seal ring 15.

The seal member 19 shown in FIGURES 2, 3 and 5 is of T-section with the leg portion 20 disposed in a horizontal plane and projecting inwardly while the cross member 21 is disposed vertically and retained within the slot 22 formed between the top edge of the seal ring 16 and the keeper ring 23 secured to the horizontal surface of the distributor ring 17 by the bolts 24. The portion of the slot 22 retaining the cross member 21 of the seal member 19 has a horizontal depth greater than the thickness of the cross member 21 to allow for limited outward radial movement of the seal member 19 but providing a positive limit to its inward movement. Initially, the inner periphery of the seal ring member 19 is machined to an interference fit with the outer peripheral surface of the seal ring 14 over which it is to be fitted, i.e. the seal ring member 19 is to be machined to the same diameter as the machined peripheral face of the seal ring 14. The seal ring member 19 being flexible in comparison with the seal ring 14 of the runner member, is readily fitted about the seal ring 14 and, after assembly in the stationary member 16, where the seal ring member is held against rotation, it becomes bedded down on the surface of the seal ring 14 to provide the desired minimum running fit clearance. This minimum running fit clearance would amount to approximately five thousandths of an inch. The seal member 19 may be L shaped or any other shape convenient for stopping radial movement at a definite point.

The seal member 19 can be a continuous annular ring but is preferably made up of a number of sectors 19b as illustrated in FIGURES 7 and 8. These sectors 19b have their adjacent ends notched out at 27 to fit around the threaded pins 28 secured to the seal ring 16 at spaced intervals around the solt 22. Instead of pins 28 as shown, any other convenient form of stop may be used to prevent rotation. Alternatively, the seal 19 may be left free to rotate in the seal ring, there being little tendency to such rotation. These pins 28 prevent the sectors 19b from rotating relative to the seal ring 16. The slot 22 can be deepened radially as illustrated in FIGURE 5 and an expansible member 29 be fitted behind the seal member 19. In this case the seal member 19 is kept facing against the seal ring 14 to prevent the entry of dirt and silt into the confined spaces beyond the seals. The expansible member may also be any resilient body which fills all or part of the space behind the seal member 19, thereby excluding dirt from the space or that part of the space.

In FIGURE 6 a seal member 30 similar to the seal member 19 and having an inflatable tube 31 is shown applied against the shoulder 32 of a vertical shaft 33.

In FIGURE 4 an alternative form of seal member is disclosed. This particular form of seal member is designed to cut down to a minimum the leakage of water past the seal. The seal member 34 has a downwardly depending lip portion 35 so proportioned as to operate in vertical contact with the mating surface of the runner seal ring 14 but with a chosen small specific pressure smaller than the head across the seal. The stationary seal ring 36 has a double recess 37 which is preferably large enough to allow complete retraction of the seal member 34 in the event of large movements of the runner.

In order to cut down turbulence caused by water leaking past the seal members or backed up from the draft tube, air is introduced into a confined area beyond the seal member. Referring first to the seal between the seal rings 14 and 16 at the runner band 7. A certain amount of water from the distributor ring 17 will leak past the seal member 19 into the confined annular space 38 and will flow out under the edge of the runner 5 into the draft tube 39. In order to further restrict the amount of water entering, the confined annular space 38, air is introduced into this confined space by means of the air pipe 40. Pressure conditions at the upstream side of the seal 19 and in the area of enlarged clearance 38 below the seal, and between the area of enlarged clearance 38 and the vacuum in the draft tube 39 are such that the area of the slots 47 could be as much as ten times greater than the area of the leakage past the seal 19. This is due to the greater pressure differential across the seal 19 compared with the pressure differential existing across the openings 47. Pressure conditions in this confined zone 38 are such that it is likely that atmospheric air will enter this space of its own accord if an air pipe is provided. Once the space is filled with air little or no make-up air will be required. A valve 41 controls the amount of air delivered through the pipe 40. In order to provide a non-turbulent flow of the leakage water through the confined space 38 an annular baffle 42 may be provided as shown in FIGURE 2. This baffle 42 divides the space 38 into two compartments with the air being fed into the inner compartment 44 and the water flowing down through the compartment 45 and down under the edge of the runner 5. The baffle 42 is supported on the flange 46 and is provided with the slots 47 to allow the water to flow out into the draft tube 39.

Referring now to the upper seal between the seal rings 13 and 15. The leakage water passing between the seal rings 13 and 15 passes into the chamber 48 through the apertures 49 on the bottom wall 50 of the head cover 51 and is allowed to flow out of the chamber 48 through the apertures 52 and then through the apertures 53 in the runner crown 8, past the runner cone 11 and into the draft tube 39. Pressure air is fed through the pipe 54 into the chamber 48 and a stand pipe or series of stand pipes 55 allows the air within the chamber 48 to pass down into the space 56, between the runner crown 8 and the fixed head cover 51. The air within the space 56 between the runner crown 8 and the fixed head cover 51, assisted by centrifugal force, forces the water leaking past the upper seal member 19a between the seal rings 13 and 15 to enter the chamber 48 through the apertures 49 and so keep this space 56 free of water. Because of the vertical location of the apertures 52 very little water should accumulate in the bottom of the chamber 48 and the operation of expelling the water out of the space 56 should be good without the stand pipe 55, the stand pipe being only necessary should the chamber 48 become flooded for a short period.

The air supply pipe 54 may go directly to space 56 in which case the stand pipe 55 is not required. The chamber 48 in the head cover 51 will be large enough so that the flow of water from the head cover back into the draft tube will not be excessively turbulent and, therefore, little make-up air will be entrained with the water.

The air pressure required in the supply pipe 54 will depend on the pressure of the water at the runner cone 11. Under many operating conditions atmospheric pressure will be sufficient and any water which has leaked past the seal rings will run out by gravity. Once the spaces 38 and 56 are full of air, the air valves 41 and 57 may be partly closed and a small amount of make-up air will be sufficient to keep the water from filling these spaces.

The amount of water which could leak past the seals will vary under different operating conditions of load, speed and pressure variables and the runnnig fit tolerance of the seal ring member 19 in relation to the diameter of the runner. This leakage can be controlled and practically eliminated by variably controlling the pressure of the air delivered to the spaces 38 and 56 in accordance with any change of these operating conditions as they take place.

An advantage of introducing air into the turbine close to the anti-circulation seal 58 at the inner part of the runner crown 8, or in approximately the position of the stand pipes 55 is to keep much of the runner crown free of water. It is usual practice to introduce air in the vicinity of a turbine runner at some or all of the openings for the gates 18, usually at low gate openings in order to stabilize the flow of water. Introduction of this air through the pipes 54 and 55 will fulfil the usual practice as the air will pass through the apertures 49, 52 and 53 to the draft tube 39, if these apertures provide ample area to pass the water leaking past the upper seal 19a.

The spaces between the runner and stationary parts may be filled with air relatively slowly with the turbine stopped. If it is necessary to evacuate the water from these spaces while running, turbulence may be such as to make this impossible with a small air supply. The leakage water from the crown and band seals can be led away through pipes, instead of through internal passages as shown, and returned to the draft tube or elsewhere.

With the above described means for sealing the runner of a turbine or pump with respect to the stationary member a very close seal can be obtained. Machining the inner surface of the sealing members to a very close tolerance or no tolerance and providing space for free radial movement of the sealing members allows the sealing member to take up an off centre position should the runner not be rotating on its true axis without damaging friction between the runner and the sealing member. While the single sealing member illustrated cuts down appreciably the amount of water leakage between the runner and the stationary member, it is to be understood that more than one sealing member can be fitted into each of the sealing rings so that if one sealing member allowed 100 gallons per minute to pass, two sealing members would cut down this leakage to say 50 gallons per minute. Furthermore, the introduction of a supply of air at the downstream side of the seals ensures that the runner is mainly rotating in an air space thereby eliminating to a great extent friction and turbulence.

What we claim is:

1. In a turbine including a runner member having runner blades and a stationary member, the space between said stationary member and said runner member having an annular area of restricted clearance upstream of the runner blades and an annular area of enlarged clearance on the downstream side of the area of restricted clearance, in combination, means for sealing the annular area of restricted clearance between the stationary member and runner member, a baffle dividing the area of enlarged clearance into two compartments comprising an inner compartment between the runner member and one side of said baffle and an outer compartment on the opposite side of the baffle, each of said compartments having at least one open end and being in communication with said area of restricted clearance, means for supplying air under pressure to said inner compartment whereby water leaking past said sealing means is directed to the outer compartment thus minimizing frictional losses between the runner member and the leakage water, and outlets from said outer compartment to discharge the leakage water downstream of the turbine blades.

2. In a turbine including a runner member having runner blades and a stationary member, the space between said stationary member and said runner member having an annular area of restricted clearance upstream of the runner blades and an annular area of enlarged clearance on the downstream side of the area of restricted clearance, in combination, means for sealing the annular area of restricted clearance between the stationary member and runner member, said means comprising an annular sealing member extending around said runner member, said sealing member being mounted in said stationary member and having limited radial movement therein in a plane at right angles to the axis of rotation of said runner member, the said annular sealing member being in running fit contact with the adjacent peripheral surface of said runner member, a baffle dividing the area of enlarged clearance into two compartments comprising an inner compartment between the runner member and one side of said baffle and an outer compartment on the opposite side of the baffle, each of said compartments having at least one open end and being in communication with said area of restricted clearance, means for supplying air under pressure to said inner compartment whereby water leaking past said sealing means is directed to the outer compartment thus minimizing frictional losses between the runner member and the leakage water, and outlets from said outer compartment to discharge the leakage water downstream of the turbine blades.

References Cited in the file of this patent

UNITED STATES PATENTS

| | | |
|---|---|---|
| 660,282 | Trump | Oct. 23, 1900 |
| 1,424,655 | Kurtz | Aug. 1, 1922 |
| 1,823,702 | Ring | Sept. 15, 1931 |
| 2,416,268 | Nagler | Feb. 18, 1947 |
| 2,449,375 | Ferguson et al. | Sept. 14, 1948 |
| 2,648,491 | Wood | Aug. 11, 1953 |
| 2,758,815 | Fontaine et al. | Aug. 14, 1956 |
| 2,796,027 | Brown | June 18, 1957 |
| 2,860,827 | Egli | Nov. 18, 1958 |
| 2,907,595 | Benson et al. | Oct. 6, 1959 |

FOREIGN PATENTS

| | | |
|---|---|---|
| 330,261 | Switzerland | July 15, 1958 |